Nov. 27, 1923.
W. S. COTHRAN
PLOWHITCH
Filed Nov. 6, 1922
1,475,799
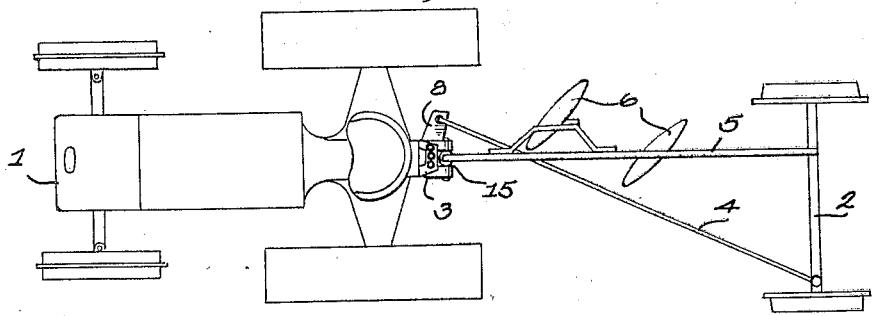
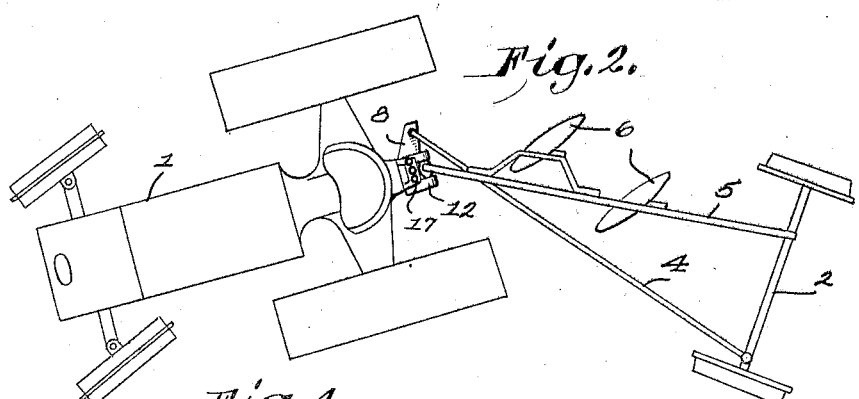
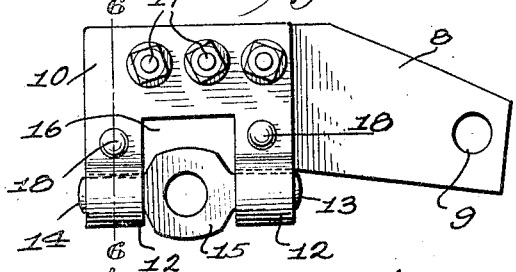
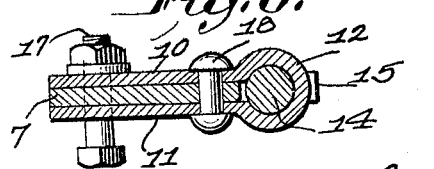
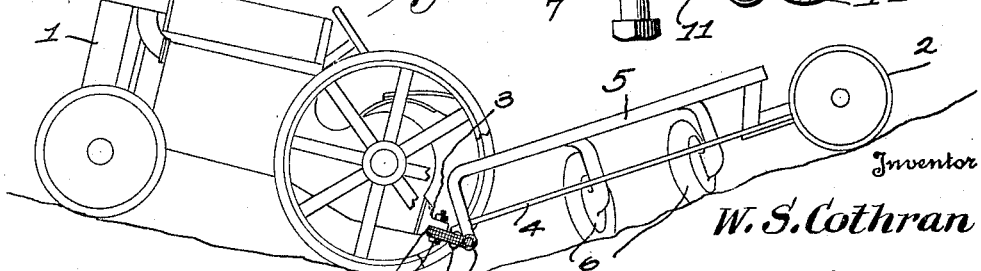
Inventor
W. S. Cothran
By Wilkinson & Giusta
Attorneys Patented Nov. 27, 1923.

1,475,799

UNITED STATES PATENT OFFICE.

WALTER SULLIVAN COTHRAN, OF ROME, GEORGIA, ASSIGNOR TO TOWERS & SULLIVAN MANUFACTURING CO., OF ROME, GEORGIA, A CORPORATION OF GEORGIA.

PLOWHITCH.

Application filed November 6, 1922. Serial No. 599,283.

*To all whom it may concern:*

Be it known that I, WALTER S. COTHRAN, a citizen of the United States, residing at Rome, in the county of Floyd and State of Georgia, have invented certain new and useful Improvements in Plowhitches, of which the following is a specification.

The present invention relates to improvements in plow hitches and is useful particularly in coupling plows to tractors.

An object of the invention is to provide a hitch or coupling which will permit the forward end of the plow to yield up and down in traversing hills and depressions as much expense and annoyance has been incurred due to the breakage of prior rigid couplings incident to travel under such conditions.

The improved coupling has been designed to cooperate with the plow guide rod, is simple and inexpensive in construction and readily attachable to the draw bar or pull plate of the tractor.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a diagrammatic plan view of a tractor, and plow coupled together with the improved hitch.

Figure 2 is a similar view showing the condition of the members when turning.

Figure 3 is a side view of coupled tractor and plow passing through a depression.

Figure 4 is an enlarged plan view of the hitch.

Figure 5 is an edge view thereof, and

Figure 6 is a section on the line 6—6 in Figure 4.

Referring more particularly to the drawings, 1 designates the tractor and 2 the plow, the former having a draw bar or pull plate represented at 3 and the plow having a guide rod 4. The plow beam is shown at 5 and the disc or other plows at 6.

In accordance with the invention the tractor pull plate 3 which carries three bolts generally, although this number is by no means essential to the invention, receives therebeneath the improved hitch. The hitch comprises a plate 7 having an extension piece 8 projecting laterally and preferably slightly rearwardly in which is made a perforation 9 to receive the down-turned end of the guide rod 4. This connection is to be rather loose to permit the relative position of the parts shown in Figure 3 and to enable the plow to adjust itself freely to surface conditions.

The plate 7 receives a yoke; the legs 10 and 11 of which lie respectively above and below the plate and flat against the plate, while the bight 12 is rounded to receive the trunnions 13 and 14 of a swivel eye 15. Both the plate 7 and the yoke are cut away to provide a space 16 for the swivel eye, the eye lying substantially in line with the plate 7 and swinging in practically a vertical plane, or in other words the pivots of the eye are horizontal or substantially so.

The three bolts above referred to as carried by the tractor pull plate 3 are indicated at 17 and they pass through not only said pull plate but also the yoke members 10 and 11 and the hitch plate 7 and serve to hold such parts together. In this they are aided by the rivets or other fastenings 18 inserted through the hitch plate and yoke parts at opposite sides of the opening 16 and near the divided end portions of the bight 12. The rivets thus avoid casual opening of the bights which would result in loosening of the bearings for the trunnions and the consequent rattling of parts besides possible faulty functioning, and the presence of the rivets at the points where placed stiffens the bifurcated portions of the hitch plate and yoke and prevents the tearing out or distortion of the members.

In the use of the device the front end of plow beam 5 is inserted through the swivel eye 15 in the same way that it is engaged at the present time with the pull plate; and the guide rod 4 is inserted into the perforation 9 in the extension plate 8.

It is of course understood that the improved hitch is coupled to the pull plate 3 by the use of the bolts 17. The plow and tractor are thus coupled together and the hitch will draw the plow after the tractor in a free and more or less loose manner leaving the plow to accommodate itself to changes in the surface over which it is moved. The chief advantage to be derived from the use of this hitch is illustrated in Figure 3, wherein the coupled ends of the tractor and plow are seen to be passing through a ditch or surface depression in the soil while the front end of the tractor is at a substantial elevation as is likewise the rear end of the plow. Experience with the old form of rigid hitch, by which I mean the hitch, that does not permit of this vertical yielding between the two members, shows that quite frequently breakage occurs under conditions of use as represented in Figure 3 because the rear end of the tractor forces the forward end of the plow down and the character of the ground prevents the rear end of the plow keeping in the same horizontal plane with the front end.

The eye 15 swivels freely and readily upon the trunnions and should breakage occur, the eye may be replaced at small cost by withdrawing the bolts 17 and rivets 18 which is a prerequisite to the disassembly of the hitch. The hitch is made of suitable material, preferably iron or steel and by virtue of the arrangement of the yoke and plate the construction is strong.

It is obvious that various changes and modifications may be made in the details of construction and design of the above specifically described embodiment of this invention without departing from the spirit thereof, such changes and modifications being restricted only by the scope of the following claims.

I claim:—

1. A hitch for plows comprising a plate, a yoke folded upon said plate, the intermediate rear part of the plate and yoke being cut away, the yoke being rolled to provide bearings, and an eye having lateral trunnions fitted in said bearings, said eye adapted to receive a substantially vertical portion of the plow to be drawn and said eye adapted to rock upon the trunnions in the bearings in a substantially vertical plane.

2. A hitch for tractors comprising a supporting structure mounted upon the rear of the tractor and having an intermediate rear cut away portion with bearings at opposite sides of the cut away portion, and an eye occupying the cut away portion and having lateral trunnions fitting in said bearings, said eye adapted to receive a substantially vertical portion of the implement to be drawn and adapted to swing upon the trunnions in the bearings in a substantially vertical plane to permit of the implement and tractor hinging relatively to one another in conformity with the surface character of the ground.

3. A hitch for plows or the like comprising a plate having a perforated extension piece, a yoke folded upon and secured to the plate, and an eye having trunnions swiveled in the yoke, substantially as described.

WALTER SULLIVAN COTHRAN.